United States Patent [19]
McLaughlin

[11] Patent Number: 5,259,339
[45] Date of Patent: Nov. 9, 1993

[54] CONTAINER FOR TREATING ANIMALS

[76] Inventor: Brian D. McLaughlin, 845 S. Orange Dr., Los Angeles, Calif. 90036

[21] Appl. No.: 915,459

[22] Filed: Jul. 16, 1992

[51] Int. Cl.$^5$ ............................................. A01K 13/00
[52] U.S. Cl. ............................................. 119/158
[58] Field of Search ............................ 119/19, 158, 159

[56] References Cited

U.S. PATENT DOCUMENTS

| | | | |
|---|---|---|---|
| 2,536,943 | 1/1951 | Kessel | 119/158 |
| 2,661,865 | 12/1953 | Wendt | 119/158 X |
| 4,730,576 | 3/1988 | Yoshikawa | 119/158 |

FOREIGN PATENT DOCUMENTS

| | | | |
|---|---|---|---|
| 467437 | 6/1914 | France | 119/158 |
| 2543795 | 10/1984 | France | 119/158 |

*Primary Examiner*—Robert P. Swiatek

[57] ABSTRACT

The invention comprises a tank-like container with an upwardly inclined headrest for the animal, a ratcheted top rail containment arrangement, and a cord lock restraint system for securing the animal's head and body in a proper position. The container is wider at the bottom to provide greater stability and incorporates a bulbous protrusion at the base along the front to provide additional space for the legs of larger animals. The top of the container, which slides onto the ratcheted rail and can be released by pressing tabs thereon, is configured to allow manual access to the animal through the top. There is a rinsing port near the top in the front of the container and a drain port near the bottom in the back of the container. The container includes a horizontal rib running circumferentially around the container to provide structural strength and additional wall support for the unit.

24 Claims, 3 Drawing Sheets

CONTAINER FOR TREATING ANIMALS

BACKGROUND OF THE INVENTION

This invention relates to methods and apparatus for bathing or treating household pet animals, and in particular to a container in which such an animal can be comfortably restrained while being bathed and dried.

There exists a need for a container arrangement which can be adjusted to accommodate cats and dogs of various sizes while they are given a flea bath, an ordinary bath or an immersing fluid treatment. Ideally such a container arrangement would permit restraint of the animal during the dipping, washing and/or drying process and allow for easy filling and emptying of the bathing or treating solution. At the same time, such a container should be light in weight but ruggedly constructed and impervious to damage from chemical solutions. It would also be desirable that such a defleaing or bathing container be adjustable to the height of the animal being treated. Finally, it would be convenient if the animal could be dried inside the container after the bath.

The patents listed below are deemed to be of some relevance to the present invention.

| U.S. Pat. No. | Name of Inventor | Date Issued |
| --- | --- | --- |
| 990,126 | E. F. Graefe | April 18, 1911 |
| 2,536,943 | C. E. Kessel | January 2, 1951 |
| 2,661,865 | D. O. Wendt | December 8, 1953 |
| 3,596,636 | Stobaugh | August 3, 1971 |
| 3,941,092 | Winters | March 2, 1976 |
| 4,057,032 | Dimitriadis | November 8, 1977 |
| 4,083,328 | Baker | April 11, 1978 |
| 4,316,433 | Hebert | February 23, 1982 |
| 4,407,234 | Kleman | October 4, 1983 |
| 4,730,576 | Yoshikawa | March 15, 1988 |
| 4,819,829 | Rosten et al | April 11, 1989 |
| Des. 215,056 | Schwertley | August 26, 1969 |
| Des. 218,045 | Lee et al | July 14, 1970 |
| Des. 230,038 | Tansel | January 22, 1974 |
| Des. 274,760 | Henderson | July 17, 1984 |
| Des. 291,014 | Grum | July 21, 1987 |

U.S. Pat. No. 2,536,943 to C. E. Kessel is directed to an animal bathing device. The bathing device 10 includes a box-like tub 12 into which the animal is received, the top 18 having an opening 30 formed therein which may be adjustably tightened about the animal's neck. The top 18 is provided with an opening 24 through which rinsing fluid may be introduced.

U.S. Pat. No. 2,661,865 to D. O. Wendt is directed to a tank adaptable for use in the treatment of small animals either in the form of a bath or dip. An open-topped tank 10 has a bottom 20 sloping downward from a front wall 16 to a back wall 18. Front wall 16 has a semicircular, inwardly inclined trough or apron 26 secured thereto. There is a platform 58 whose height can be adjusted to dispose the animal's head in overlying relationship to trough 26.

U.S. Pat. No. 3,941,092 to Winters is directed to a pet sanitizer for bathing, rinsing, or fumigating household pets. Referring to FIGS. 1, 4 and 6, it can be seen that the unit 11 includes a container 13 having a plurality of spaced openings 23 through which treating fluids may be introduced, and for drainage of such fluids. Additionally, the unit 11 comprises an elevated platform 33 which may be disposed at the bottom of container 13 for supporting an animal so that its head protrudes through a large circular opening in one end of the unit when a hinged cover 17 is in its lowered position.

U.S. Pat. No. 4,316,433 to Hebert is directed to an animal washing stand adapted to be disposed within a washbasin. The stand 10 includes a foot structure defined by a plurality of downwardly depending nubs 42B to which variably sized standoffs 42 and 44 may be coupled such that the stand may be positioned at a most favorable height. Additionally, a cord lock restraint system is defined by a leash structure 30 wherein a central position 26 couples a collar 28 to the stand 10 by a plurality of locking projections 39.

U.S. Pat. No. 4,730,576 to Yoshikawa is directed to a washing and drying system for small animals. Referring to FIGS. 1-6, a washing tub 2 has a plurality of water current output ports 15A formed therein. The tub is provided with a moveable lid 9 and a top panel 3, each having respective notches 12 and 4 defining an opening for the neck of the animal. Lastly, the tub 2 is provided with an adjustable footing board 14 which may be shifted to various level positions to accommodate different-sized animals.

U.S. Pat. No. 4,819,829 to Rosten et al is directed to a closure for a container for pourable materials. Closure 10 has a planar cover portion 14 incorporating a slide 38 moveable between predetermined positions established by a plurality of detents 44 for providing releasable engagement with respective protrusions 46 formed in slide 38.

None of the inventions described above possesses all the features and advantages of the present invention.

SUMMARY OF THE INVENTION

The invention comprises a tank-like container with an upwardly inclined headrest for the animal, a ratcheted top rail containment arrangement, and a cord lock restraint system for securing the animal's head and body in a proper position. The container is wider at the bottom to provide greater stability and incorporates a bulbous protrusion at the base along the front to provide additional space for the legs of larger animals. The top of the container, which slides onto the ratcheted rail and can be locked in position, has a configuration that allows manual access to the animal through the top of the container. There is a rinsing port near the top in the front of the container and a drain port near the bottom in the back of the container. The container includes a horizontal rib running circumferentially around the container to provide structural strength and additional wall support for the unit.

DESCRIPTION OF THE PREFERRED EMBODIMENTS

Figure 1:
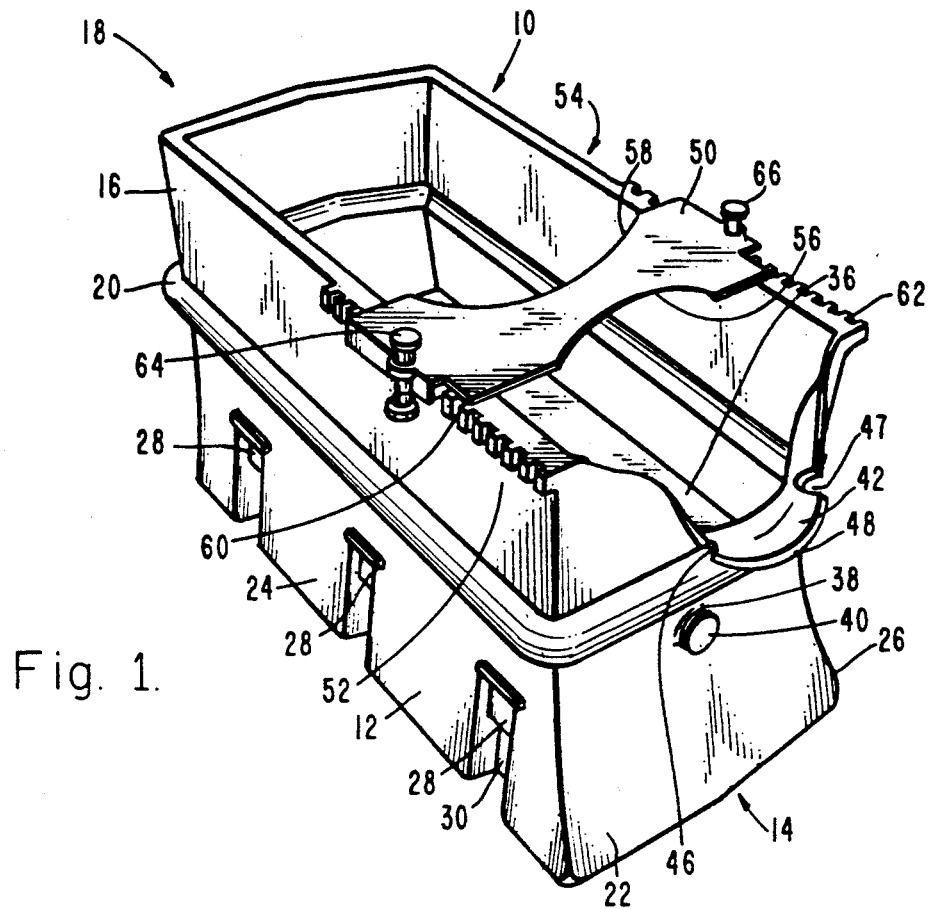
FIG. 1 is a perspective view of the pet treatment container of the present invention.

Referring to the figures of drawings wherein like reference numerals designate like elements throughout, FIG. 1 depicts an embodiment of a pet bath container 10 designed for delousing, shampooing, and drying a pet. For ease of illustration and description, the drawings illustrate only the pertinent features of the present invention and do not show the remaining conventional features.

In the illustrated embodiment, pet defleaing, treating or bathing container 10 comprises a lower base part 12 having a closed bottom 14 and an upper part 16 having an open top 18. Lower base part 12 and upper part 16 intersect in an outwardly convex bead 20 which runs around the periphery of container 10 to provide stiffening and strengthening of the structure.

Lower base part 12 is generally parallelipipedal except for an outwardly bulging front end portion 22 and inwardly and upwardly sloping side walls 24 and 26 near bottom 14, which is wider than top 18.

A plurality of first and second step portions 28 and 30 project inwardly from side walls 24 and 26 to form first and second series of discrete ledge portions 32 and 34 (not seen in FIG. 1). In FIG. 1 a removable platform 36 rests on the first series of ledge portions 32 inside container 10.

A first orifice 38 near bead 20 in the front end of container 10 is normally closed by a first stopper 40 to allow filling of container 10 with a liquid.

Upper part 16 has an outwardly and downwardly flaring collar portion 42 at a front end of open top 18. Collar portion 42 has first and second inward notches 46 and 47 as well as a downwardly hooked lip 48.

A cover slat 50 spans the distance between upper side walls 52 and 54 at open top 18. Slat 50 has front and back cutout portions 56 and 58, respectively, and is slidably attached to first and second rack portions 60 and 62 of upper side walls 52 and 54 near open top 18 at the front end of upper part 16 by pins 64 and 66.

Figure 2:
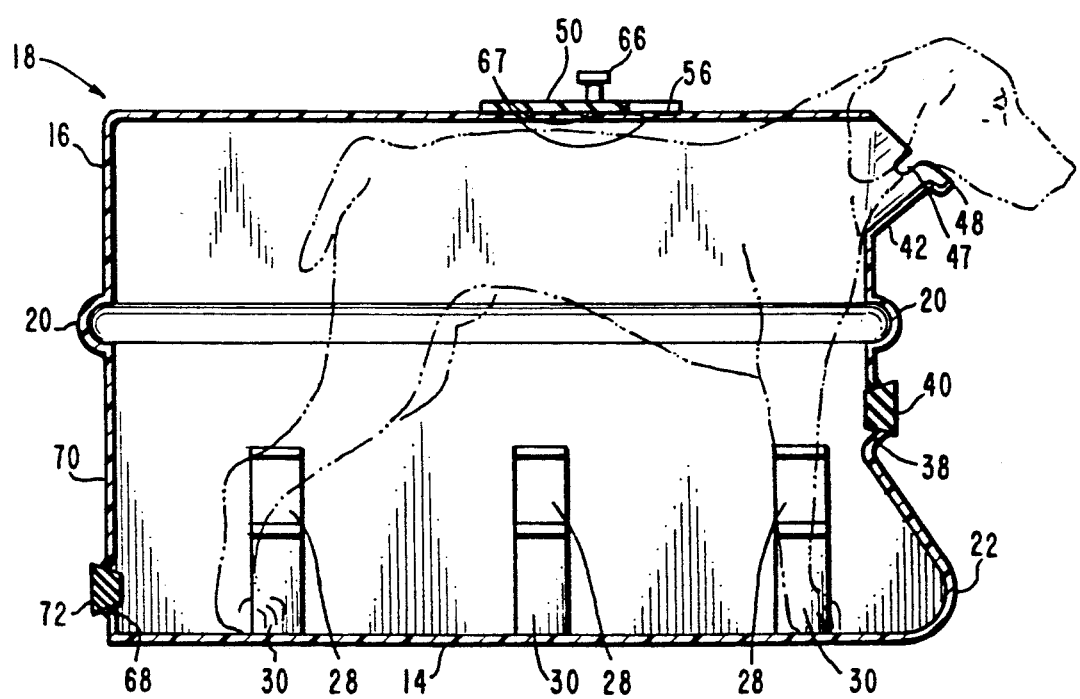
FIG. 2 is a sectional view of the treatment container with a dog shown in phantom outline inside the container.

Referring to FIG. 2, the pet defleaing and bathing container 10 of the present invention is shown in cross-section with a dog shown in phantom outline inside the container. The head and neck of the dog rest on collar portion 42.

Figure 4:
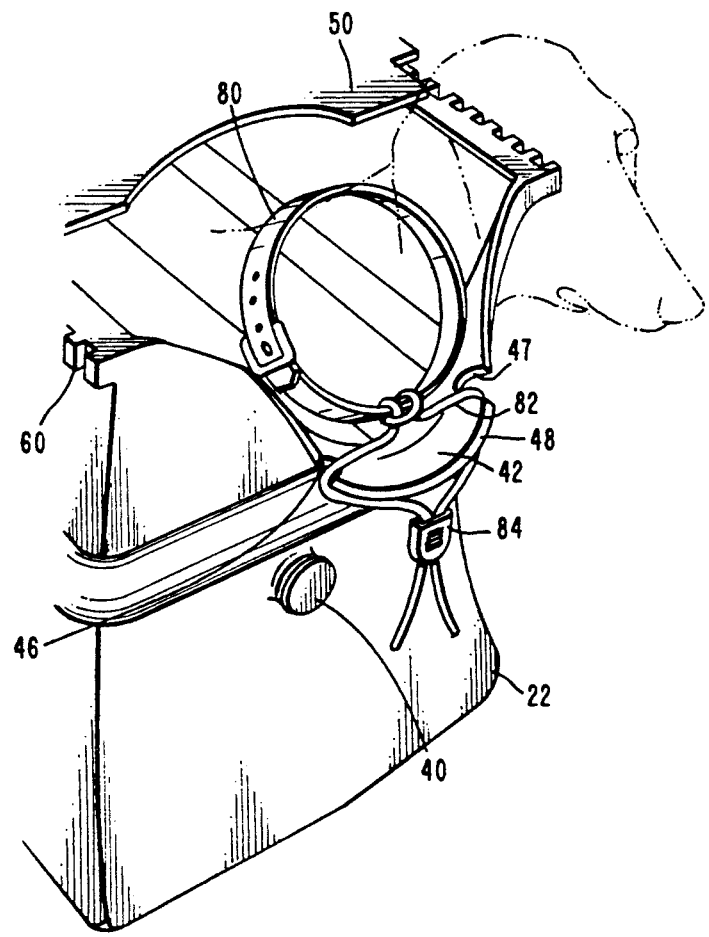
FIG. 4 is a fragmentary perspective view of the treatment container with a dog in phantom outline showing the cord lock restraint system attached to a collar on the dog.
Figure 6:
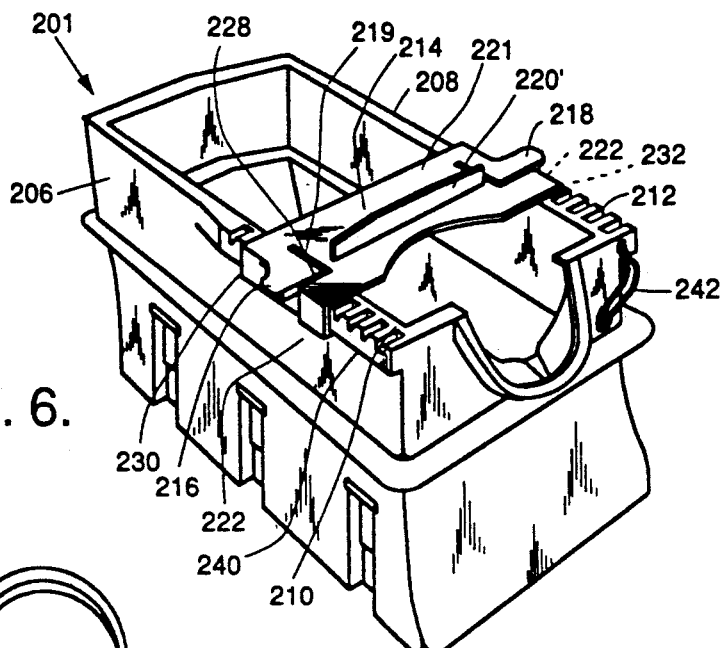
FIG. 6 is a perspective view of an alternative embodiment of the pet container illustrating a different type of upper cover-restraint member and means of associating with the container.
Figure 7:
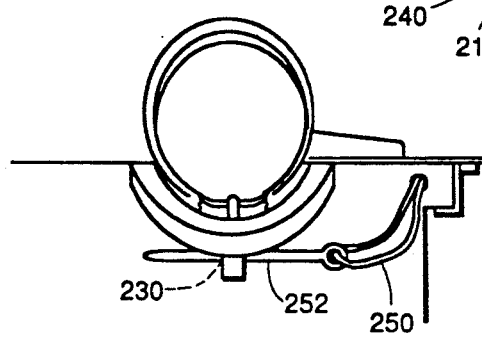
FIG. 7 is a fragmented view of the front portion of the container illustrating the manner in which an animal may be restrained.
Figure 8:
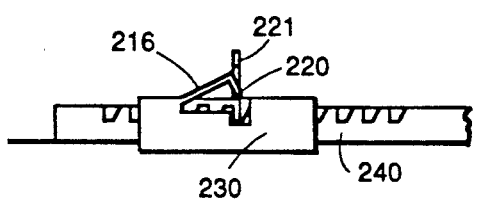
FIG. 8 is a fragmented view of the locking mechanism of the top cover in association with the container.
Figure 9:
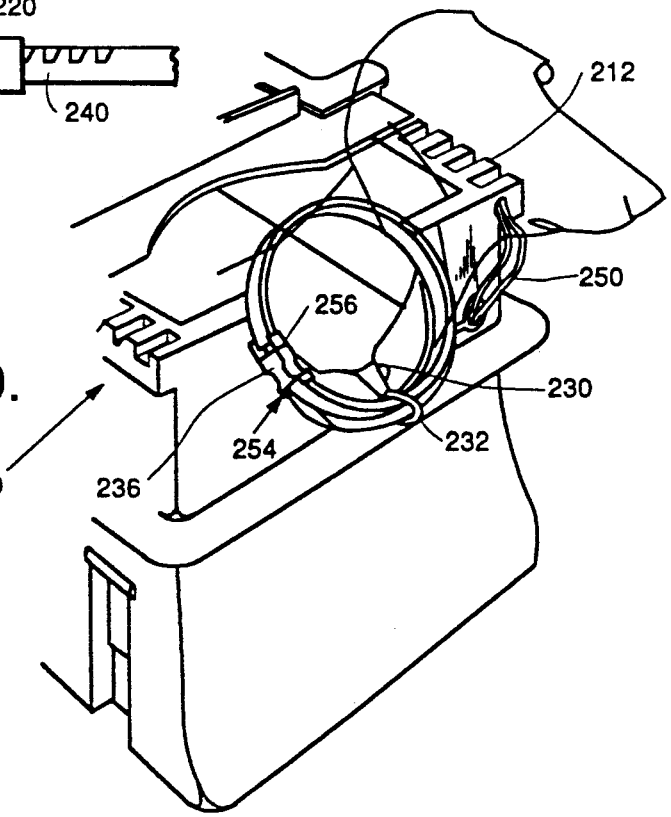
FIG. 9 is fragmented view in perspective illustrating the manner in which the head of an animal is restrained in the container of the invention.

Normally, cover slat 50 would be moved forward to just in back of the neck of the animal. The animal would be wearing a collar and a short length of cord would be tied to the collar or looped through it with the two free ends of the cord going through notches 46 and 47 and being secured underneath lip 48 (as shown in FIG. 4).

The dog shown in FIG. 2 is of a size large enough so that there is no need for a platform 36 to be inserted in container 10 to rest on ledge portions 34 or 32. Shorter animals would stand on platform 36 during the bathing or defleaing process.

Referring still to FIG. 2, an underside of cover slat 50 has a plurality of spaced-apart linear stiffening ribs 67 running from near upper side wall 52 to near upper side wall 54 along the length of slat 50. A second orifice 68 is located near bottom 14 in rear end wall 70. A second stopper 72 is used to close off second orifice 68 when container 10 is filled with a liquid.

Figure 3:
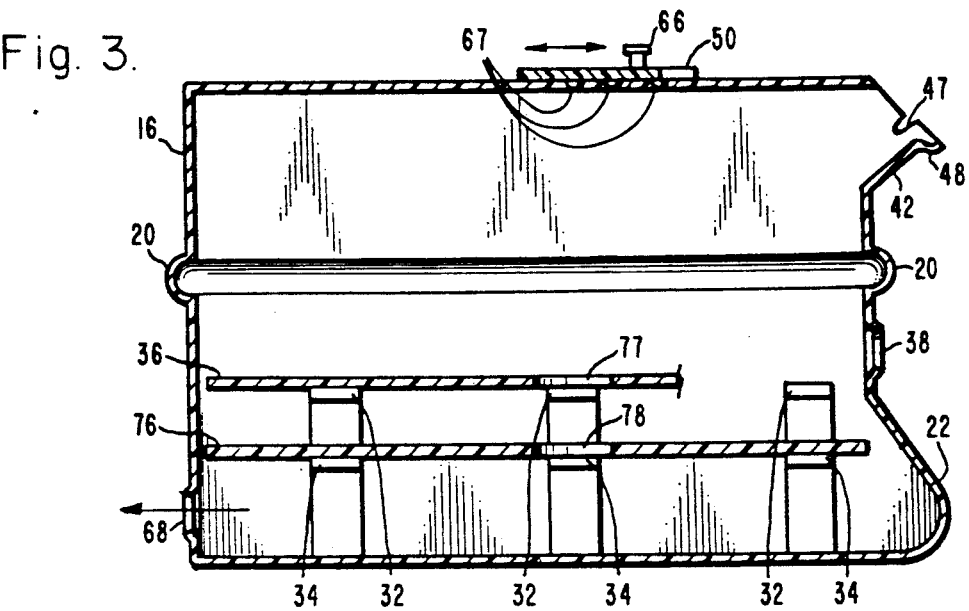
FIG. 3 is a sectional view of the treatment container of FIG. 1 with platforms in place and stoppers removed.

As shown in FIG. 3, another sectional view of bathing and defleaing container 10, second stopper 72 can be removed from second orifice 68 to allow a liquid to drain from container 10. First stopper 40 can also be removed from first orifice 38 after container 10 has been drained of liquid, and hoses emitting warm, dry air can be inserted into orifices 38 and 68 to dry the animal inside container 10 after the animal has been bathed or defleaed.

As shown in FIG. 3, a first platform 36 rests on a first set of horizontal ledge projections 3 defined by inward projections 28 in side walls 24 and 26 of container 10. Similarly, a second platform 76, somewhat smaller in width than first platform 36, can be placed inside container 10 on second set of horizontal edge projections 34.

Platforms 36 and 76 have centrally located through-holes 77 and 78, respectively, through which a finger can be inserted for ease in placement or removal of the platform. They may have rounded corners for further ease of handling. The placement of platform 76 or 36 inside container 10 allows shorter animals to be bathed inside the container. The shortest animals stand on platform 36 and intermediate sized animals would stand on platform 76 with platform 36 removed from container 10 for large animals.

FIG. 4 shows further details of an animal which is held in place inside container 10. The dog whose head is shown in phantom outline in FIG. 4 wears a collar 80 to which is attached a length of cord 82. Two sides of cord 82 pass through notches 46 and 47 in collar portion 42 and are secured under lip 48 by cinching means 84.

Figure 5:
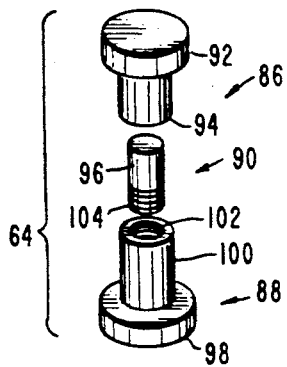
FIG. 5 is an exploded perspective view of one of the pins used to secure the adjustable cover to the top of the pet treatment container of the invention.

Details of pin 64 (or 66) are shown in FIG. 5. Each pin 64 or 66 comprises first and second similarly shaped endpieces 86, 88 and a thin connecting rod 90. Endpiece 86 consists of a first cylindrical part 92 formed contiguously with a smaller cylindrical part 94. Cylindrical part 94 contains a central hole in an end face thereof into which an unthreaded upper portion 96 of rod 90 can be press-fitted. Endpiece 88 consists of a first cylindrical part 98 and a second cylindrical part 100 of smaller diameter. A tapped hole 102 in an end face of second cylindrical part 100 accommodates a threaded end 104 of connecting rod 90.

Pet defleaing or bathing container 10 is preferably made of a plastic material that will resist attack by chemicals used to kill fleas and other vermin or treat animals. A conveniently sized container is approximately 7 inches wide by 14 inches long by 10 inches high, with a collar portion 42 that is approximately 3.5 inches wide at its widest part and extends approximately 2 inches along the upwardly inclined lowermost portion thereof.

Stiffening bead 20 can be roughly semicylindrical with a diameter of about 1 inch. Cover slat 50 can be about 3.5 inches at its widest and 1.5 inches at its narrowest front-to-back dimensions.

First and second orifices 38 and 68 can both be circular with a diameter of about 1 inch. First and second stoppers 40 and 72 can be size-5 rubber stoppers of the type ordinarily used in chemical laboratory work.

The inwardly projecting ledges in first set of ledges 32 and second set of ledges 34 can have an inwardly projection dimension of about 0.25 inch and lateral dimension of about 1 inch. First removable platform 76 is conveniently made of a stiff plastic material 3/16 inch thick and have dimensions 6.875 by 14 inches, with a central through-hole that is circular with a diameter of 0.75 inch. Second removable platform 36 is similar but with dimensions 7.25 by 14 inches so as to rest on second set of inwardly projecting ledges 34.

First and second rack portions 60 and 62 can have a front-to-back extent of about 7 inches. Pins 64 and 66 can each have an overall length of 1.625 inch with a 0.5-inch-long middle rod portion made of stainless steel press-fitted and screwed into essentially identical end portions made of brass. The brass end portions comprise inner and outer cylindrical parts, the diameters being $\frac{3}{8}$ inch and $\frac{1}{2}$ inch, respectively. The indentations in rack portions 60 and 62 are semicylindrical and have a diameter corresponding to the diameter of the inner part of the brass end portions of pins 64 and 66.

The bulging front end 22 of container 10 can extend about 1.5 inches beyond the vertical front wall of container 10, and side walls 24 and 26 can extend outwardly approximately 0.5 inch near bottom 14 and taper gradually inward along a vertical extent of about 4 inches. The side walls of container 10 are flat and parallel for about 1.75 inches below and 3.5 inches above stiffening bead 20.

Bottom 14 of container 10 may have first and second raised ridges (not shown) running from side to side near the front and back ends of container 10. Container 10 normally rests on these raised ridges when sitting on a flat horizontal surface.

The present invention incorporates several unique design features. Incrementally distinct platform support elements 74 and 78 provide separate elevations above bottom 14 to accommodate various sizes of pets. Collar portion 42 provides a comfortable resting place for the head of the animal while it is being bathed or treated.

The slight incline of collar portion 42 prevents liquids from splashing out through the front of pet defleaing bath 10. The hooked lip 48 of collar portion 42 provides a nonslip safety element for a cord-lock restraint system 82 and 84. The system of cover slat 50 with locking pins 64 and 66 cooperating with first and second rack portions 60 and 62 provides security and pet safety.

Cover slat 50 is very narrow by virtue of indentations 56 and 58, leaving almost the entire top of container 10 open. This allows the operator to place his or her hands into container 10 to massage in the solutions and shampoo the pet thoroughly. Recess 56 in cover slat 50 provides a comfortable fit and feel to the back of the neck for the pet being bathed or defleaed.

First and second orifices 38 and 68 serve dual purposes. Orifice 38 serves as a rinsing port which allows the operator to insert a hose to thoroughly cleanse the pet from the front. Second orifice 68 is a drain port which allows all liquids to be released from container 10. Both orifices 38 and 68 serve the additional purpose of drying ports. Sources of warm, dry air can be inserted in first and second orifices 38 and 68 to convert container 10 into a pet drying unit.

Horizontal bead 20 encircling container 10 can be located approximately 3.5 inches from top 18 of container 10 to provide additional wall support and strength for the unit. Container 10 is shaped broader at base portion 70 near bottom 14 to provide stability when container 10 is filled with liquid. Bulbous protrusion 22 in base portion 70 along the front of container 10 provides additional space for the front paws of larger pets so that they do not feel cramped while in container 10.

Referring to FIG. 4 again, the cord-lock restraint system which is shown operates as follows to secure the pet's head and body in a proper and safe position. Cord 48 is placed through collar 80 on the pet and both free ends are inserted through a cord-lock 84. Cord 82 is then placed in notches 46 and 47 in collar portion 42 and cord-lock 84 is pushed upward along cord 82 to a position behind hooked lip 48 until the head of the pet is securely in place on the upper and inner part of collar portion 42. Hooked lip 48 prevents cord 82 from slipping off collar portion 42. The operation of the ratcheted rail containment top system of the preferred embodiment operates as follows. The containment top, cover slat 50, with its first and second vertical lock-/release pins 64 and 66 on each side, slides onto first and second rack portions 60 and 62 from the back end of container 10. Cover slat 50 slides forward until snug at the back of the pet's neck. Lock/release pins 64 and 66 slide downward into the grooved indentations in rack portions 60 and 62 to lock cover slat 50 into place.

When pins 64 and 66 are in their uppermost positions, cover slat 50 slides freely and can be slid backwards and off container 10. Should the pet somehow free itself from the cord-lock restraint system and pull its head in underneath cover slat 50, slat 50 can quickly be moved backwards and off container 10 to open up the entire top 18 of the unit, thereby freeing the pet.

Pet defleaing container 10 should be placed on a sturdy surface top next to a sink, in a sink, or in a bathtub. Without a removable platform, container 10, as described, is suitable for large pets weighing 10 pounds and over. With removable platform 76 in place, container 10 is suitable for medium-sized pets weighing 5-10 pounds. With removable platform 36 in place, container 10 is suitable for small pets weighing 5 pounds or less. Obviously, the container 10 may be made of various sizes to suit a plurality of needs.

Referring to FIGS. 6-9 inclusive, it will be seen that container 201, in an alternate embodiment, is similar to container 10 previously described with the exceptions as will be seen. Side walls 206 and 208 have upper terminating ratcheted portions 210 and 212 respectively.

The upper cover or slat 214, in this particular instance being of integrally molded plastic, has L-shaped cutouts 219 and 221 forming tabs 216 and 218, the bottom depending walls 209 and 211 being disposed for locking and unlocking engagement with one each of a pair of aligned notches in ratchet portions 210 and 212 respectively.

Slat cover member 214 has opposed side guide portions 222 and 224 which cooperatively engage side rachet portions 210 and 212 in slidable and releasable relationship. Disengagement of the depending walls 209 and 211 of tabs 216 and 218 not only disengages the aligned notches, but also permits full disassociation of cover 214 by sliding thereof towards the back of container 201. Upwardly raised central tab 220 facilitates movement of slat cover 214, by providing an abutment surface against which to apply thumb pressure of the user, while the fore fingers are upwardly engaging the tabs 216 and 218 to disengage the notches Referring to FIGS. 6, 7 and 9, it will be seen that a tether 226 is secured to the container 201 and has a pin 228 secured thereto. Pin 228 is adapted to pass through aperture 230 into which is disposed a floating D-ring 232, which in turn is secured to collar 234 encircling the neck of an animal to be restrained in container 201. Collar 234 is provided with quick detach buckle 236 for quick release of the restrained animal should the need arise.

It should be understood that the invention in its broader aspects is not limited to the specific embodiments shown and described herein, but departures may be made therefrom within the scope of the appended claims without departing from the principles of the invention and without sacrificing their chief advantage. For example, there are a variety of different means for attaching cover slat 50 or 214 to the sides of the upper parts of the container in a slidable, fixable manner. Also, other arrangements for the filling and draining ports in the container can be envisioned. For example, the orifices 38 and 68 could additionally comprise short collars with outer threads to match screw-on caps.

These and other modifications will at once make themselves apparent to those of ordinary skill in the art, and all are intended to be covered by the appended claims.

I claim:

1. A container for bathing, defleaing or treating an animal comprising:
   an open-topped asportable basin adapted to receive the body of an animal therein and having a front wall having a cut-out portion to receive the neck of said animal;
   removable cover means for only partially covering said open-topped basin near said cut-out portion to define a space through which the head and neck of an animal may extend, and to allow access to said animal for manual treatment thereof, said removable cover means being adjustably fixable in selected positions between the front end and back end of said open-topped basin;
   a plurality of platform support means within said open-topped basin for supporting a removable platform inside said open-topped basin at one of a plurality of locations above the bottom of said open-topped basin;
   and first port means at a first height above said bottom of said basin, for allowing a fluid to enter and to leave said container; and
   second port means in said container at a second height above said bottom of said basin, for allowing a fluid to enter or leave said container;
   wherein said container can be filled with a predetermined type of liquid for bathing, treating or defleaing said animal through said open top of said basin with said first and second port means being covered, and wherein said container can be drained through said second port means after said animal is bathed or defleaed when said second port means is uncovered, and wherein said animal can be blow-dried by the insertion of hoses emitting warm dry air into said first and second port means.

2. The container of claim 1 further comprising first stopper means for sealing said first port means and second stopper means for sealing said second port means.

3. The container of claim 2 wherein said first and second stopper means are rubber stoppers each having a frustoconical lateral peripheral surface.

4. The container of claim 1 further comprising stiffening means intermediate between said bottom of said basin and said open top along an outer periphery of said basin, for stiffening and making said container more rigid.

5. The container of claim 4 wherein said stiffening means comprises an outwardly convex bead along said periphery.

6. The container of claim 1 wherein said basin has side walls sloping upwardly inward near said bottom of said basin and wherein said front wall bulges outwardly from basin adjacent said bottom.

7. The container of claim 1 wherein said cut-out portion comprises a collar portion with a downwardly curved lip at an outer periphery thereof and has first and second spaced-apart inward notches on opposite sides of a central portion of said collar portion, wherein first and second free ends of a cord or the like looped through a collar on said animal can be inserted through said first and second notches and cinched underneath said central part of said collar portion to hold said animal in position.

8. The container of claim 1 wherein said cover means comprises a generally flat rectangular panel spanning said top of said basin near said front wall, said panel having front and back indentations and having first and second lateral end slidably fixable to a first side wall and a second side wall of an upper part of said basin, respectively, whereby said panel can be moved toward or away form said collar portion to properly accommodate the head and neck of various sized animals placed in said container.

9. The container of claim 8, wherein said panel further comprises a plurality of spaced-apart strengthening ribs running longitudinally on an underside of said panel.

10. The container of claim 1 further comprising at least one substantially rectangular platform having a centrally located hole therethrough, wherein said at least one platform can be placed on one of said plurality of platform support means inside said container, wherein said container can accommodate an animal too short to be bathed in said container without said platform.

11. The container of claim 1 wherein said container is molded from a plastic material and each said platform support means comprises a first plurality of inwardly projecting spaced-apart steps in a first side wall of said basin at a predetermined distance above said bottom thereof and a second plurality of spaced-apart inwardly projecting steps in a second side wall of said basin of said container at said distance above said bottom, each inwardly projecting step in said first plurality of steps facing and opposite a corresponding inwardly projecting step in said second plurality of steps, wherein each step in a given plurality of steps projects inwardly an equal amount which decreases as said predetermined distance above said bottom increases.

12. The container of claim 1 wherein an attached lanyard and pin are secured thereto for cooperative association with a collar placed around an animal's neck, whereby said animal is restrained within said container.

13. The container of claim 1 wherein said removable cover means has opposed ear portions having depending engaging means for engaging said open-topped basin in one of a plurality of selected positions.

14. The container of claim 13 wherein the upper surfaces of said open-topped basin are provided with spaced-apart notches adapted to coact with said removable cover means for abutment engagement in one of a plurality of positions.

15. The container of claim 14 wherein said cover means is slidably disposed on the upper surfaces of said open-topped basin.

16. The container of claim 15 wherein said cover means has an indented portion adjacent said cut-out portion of said open-topped basin.

17. A container for treating, bathing or defleaing an animal comprising:

a generally parallelipedal tank having a flat bottom and an open top, having first and second side walls, and having a back end;

an inclined, generally semicyclindrical collar portion forming part of said front end contiguous with said open top having a narrow, downwardly curved lip portion at the periphery of said collar portion, with a plurality of notched slots in said lip portion;

a slidable, generally flat slat for partially covering a portion of said open top near said collar portion, said slat having a first inwardly curved indented region at a front end thereof and a second inwardly indented region at a back end thereof, and having first and second lockingly attachable means at first and second sides thereof for lockingly attaching said slat to first and second sides of said open top;

a removable platform disposed inside said container on one of a series of pluralities of inwardly projecting ledge portions, each plurality of ledge portions being at a different height above said bottom of said container; and first and second orifices in said container at first and second heights, respectively, above said bottom of said container;

wherein an animal may be placed inside said container with said animal's head and neck between said collar portion and said slat and said container may be filled with a predetermined type of liquid for bathing or defleaing said animal through said open top of said container when said first and second orifices are blocked, and wherein said container can be drained through said second orifice after said animal is bathed or defleaed when said orifices are opened, and wherein said animal can be dried by the insertion of hoses emitting warm dry air into said first and second orifices.

18. The container of claim 17 wherein said side walls slope upwardly inward near said bottom, and said front end extends outwardly near said bottom.

19. The container of claim 17 further comprising an outwardly convex bead of material approximately halfway between said bottom and said open top and running peripherally, around said container.

20. The container of claim 17 wherein said platform has a central aperture for ease in placement or removal of said platform.

21. The container of claim 17 further comprising first and second plug means for blocking said first and second orifices in said container.

22. The container of claim 17 wherein said first and second means for lockingly attaching said slat to said container comprise first and second pins insertable in indentations defined by first and second rack portions of said open top near said collar portion.

23. The container of claim 22 wherein each said pin comprises:

a first endpiece including first and second contiguous cylindrical portions having first and second diameters, respectively, said first cylindrical portion having a larger diameter than said second cylindrical portion, said second cylindrical portion having an endface with a central blind hole therein;

a rod having a first end with a diameter suitable for press-fitting into said blind hole in said first endpiece, and a second end having an external threaded portion thereon;

a second endpiece comprising third and fourth contiguous cylindrical portions having third and fourth diameters, respectively, said third cylindrical portion having a smaller diameter than said fourth cylindrical portion and having a tapped blind hole in an endface thereof;

wherein said first end of said rod is press fitted into said second cylindrical portion of said first endpiece and said second end of said rod is threaded into said tapped blind hole in said third cylindrical portion of said second endpiece, and wherein said diameter of said second cylindrical portion of said first endpiece fits a diameter of said indentations in said first and second rack portions.

24. The container of claim 17 wherein said slat further comprises a plurality of spaced-apart strengthening ribs running longitudinally on an underside of said slat.

* * * * *